United States Patent [19]

Salin

[11] Patent Number: 5,682,600
[45] Date of Patent: Oct. 28, 1997

[54] METHOD FOR STARTING A SHORT MESSAGE TRANSMISSION

[75] Inventor: Hannu-Pekka Salin, Vantaa, Finland

[73] Assignee: Nokia Telecommunications Oy, Espoo, Finland

[21] Appl. No.: 403,901

[22] PCT Filed: Sep. 17, 1993

[86] PCT No.: PCT/FI93/00373

§ 371 Date: May 9, 1995

§ 102(e) Date: May 9, 1995

[87] PCT Pub. No.: WO94/07338

PCT Pub. Date: Mar. 31, 1994

[30] Foreign Application Priority Data

Sep. 18, 1992 [FI] Finland ................................ 924198

[51] Int. Cl.$^6$ .................................................. H04Q 7/00
[52] U.S. Cl. .......................... 455/33.1; 379/58; 379/63; 455/58.2
[58] Field of Search ........................ 455/33.1, 33.2, 455/67.7, 32.1, 58.2; 379/63, 58, 59

[56] References Cited

U.S. PATENT DOCUMENTS 4,677,613  6/1987  Salmond et al. .

FOREIGN PATENT DOCUMENTS 8911126  11/1989  WIPO .
9210041  6/1992  WIPO .

OTHER PUBLICATIONS

Recommendation GSM 03.40 "Technical Realization of the Short Message Service—Point-to-Point" Feb. 1992; see p. 13 (paragraph 3.2.6)—p. 14 (paragraph 3.2.7).
Release Note, Recommendation GSM 01.02, General Description of a GSM PLMN Mar. 1990.
ETSI/GSM, Apr. 9, 1990, Source: GSM/PT12, Report GSM 11.30, Mobile Services Switching Centre Version 3.2.1.

Primary Examiner—Reinhard J. Eisenzopf
Assistant Examiner—Darnell R. Armstrong
Attorney, Agent, or Firm—Cushman Darby & Cushman Intellectual Property Group of Pillsbury Madison & Sutro LLP

[57] ABSTRACT

A method for starting a short message transmission in a cellular radio network, a corresponding cellular radio network, and a subscriber register for a cellular radio network. The subscriber register is equipped for sending a short message transmission start message to at least one short message service centre. For delaying start messages for short message transmission for a given subscriber, the subscriber register includes a memory, a control, a transmitter responsive to the control for sending start messages for short message transmission for a given subscriber to different short message service centres after delays of variable duration, and a delay producer, responsive to the transmitter, generating a variable delay for delaying sending of start messages for short message transmission for a given subscriber by the transmitter for a desired period of time.

5 Claims, 3 Drawing Sheets

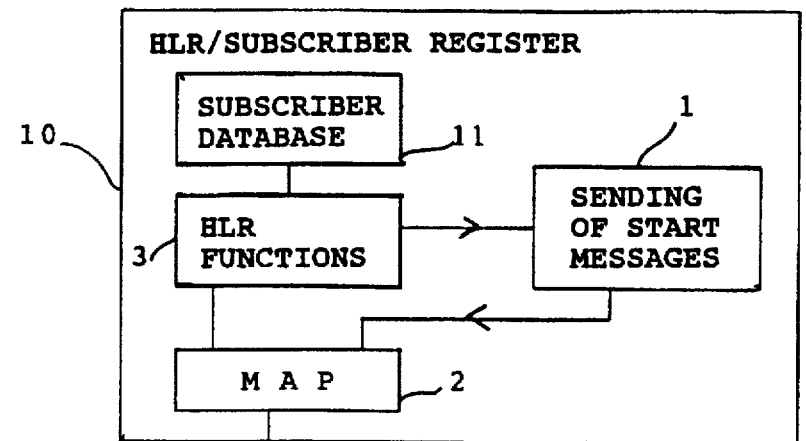
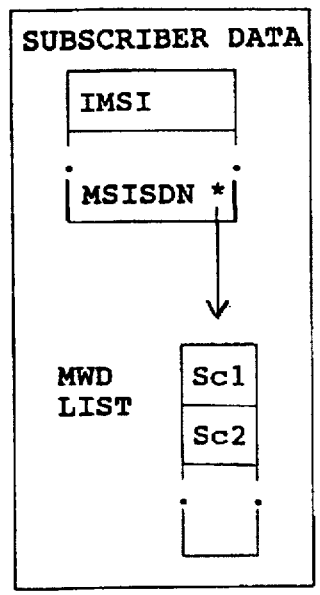
FIG. 3
FIG. 2

METHOD FOR STARTING A SHORT MESSAGE TRANSMISSION

FIELD OF THE INVENTION

The present invention relates to a method for starting a short message transmission in a cellular radio network, a corresponding cellular radio network and a subscriber register for a cellular radio network, in which method the subscriber register stores information on the fact that at least one short message service centre holds short messages for transmission to a subscriber that is not reachable, and when the subscriber requests process access to the cellular radio network, or when the subscriber data of the subscriber are location updated, the subscriber register of the subscriber sends a short message transmission start message to the at least one short message service centre.

BACKGROUND OF THE INVENTION

In connection with cellular radio networks, it is known to send short messages through a short message service centre (SC) separate from the cellular radio network. One specification for a system sending and relaying short messages is provided in the ETSI GSM system recommendation "GSM 03.40, February 1992, Technical Realisation of the Short Message Service Point-to-Point, ETSI/PT". This recommendation describes the connection of an SC to a GSM Mobile Services Switching Centre and the operation of the SC in connection with sending and relaying short messages originating outside the cellular radio network and from a subscriber in the cellular radio network (A subscriber) to another subscriber in the network (B subscriber) or to an external data transmission means capable of receiving and/or sending short messages.

When an SC attempts to send a short message to a B subscriber and the B subscriber cannot be reached, a list of waiting messages in accordance with the GSM recommendation 03.40 is set up in the home location register (HLR), for B subscriber-specific storing of addresses of SCs holding short messages for delivery to the B subscriber. Thus, when the B subscriber accesses the network, that is, when a short message can be delivered to the mobile phone of the B subscriber, the visitor location register (VLR) in whose service area the B subscriber is registered sends information on the arrival of the B subscriber in the network to the HLR of the B subscriber. Thereupon, the HLR, or subscriber register, of the B subscriber starts transmitting Alert messages to the SCs specified in the Message Waiting Data List of the given subscriber; the Alert messages signal the SCs that the B subscriber has become active within the service area of the cellular radio network and that it is worth-while attempting to send a short message to the mobile phone of the B subscriber. This kind of situation can arise, for example, when the subscriber has switched off his or her mobile phone for the night and switches it on in the morning, or respectively if the subscriber uses a mobile phone in work and switches his or her mobile phone on when his or her working hours begin. If a plurality of Alert messages arrive in a single SC, the SC may become overloaded and unable to deliver short messages to subscribers. If the SC is not overloaded, the Alert messages initiate short message transmission for the B subscriber from the SCs through the cellular radio system to the B subscriber. The short messages are stored in the SC according to the Mobile Station International PSTN/ISDN number (MSISDN) of the B subscriber; yet the SC does not recognize the different MSISDN numbers as belonging to the same subscriber, but can simultaneously initiate sending of several short messages to the same B subscriber. Likewise, if several SCs having access to the cellular radio network are attempting to send substantially simultaneously short messages to the same B subscriber, the MSC with which the VLR is integrated cannot send the short messages that have arrived after the previous short message, but must send a negative acknowledgement to the SC. Thus, collision of short messages in the MSC results in sending of negative signalling messages to the SC through the cellular radio network. In that situation, the SC will wait a predetermined period of time and retry sending the short message. A situation can now be contemplated where sending of several short messages to a given B subscriber has been attempted, but the B subscriber has had no access to the cellular radio network and the short messages addressed to the mobile phone of the B subscriber are stored in the memories of the different SCs for subsequent delivery to the B subscriber. When the B subscriber then becomes active within the area of the cellular radio network, the HLR of the B subscriber sends Alert messages to all those SCs whose memories hold short messages addressed to the B subscriber. Thereafter, all the SCs attempt to deliver—nearly simultaneously—short messages to the B subscriber. A collision of short messages arises in the MSC of the location area of the B subscriber, since the MSC can only deliver one short message at a time. For example, if ten SCs have attempted to send a short message so that the transmission of the first, i.e. previous one, of these messages has been in progress from the MSC of the location area to the B subscriber, the nine subsequent short messages cannot be sent and the outcome is failed transmission; the SCs which have sent short messages receive negative acknowledgements indicating that short message transmission from the MSC of the location area has failed. The nine SCs that failed in delivering a short message then resend the short messages to the MSC of the location area of the B subscriber for delivery to the B subscriber. In that situation, the first, i.e. previous, of these short messages reaches the B subscriber, but the eight subsequent, i.e. following, short messages do not reach the B subscriber, and consequent on failed delivery, negative acknowledgements are sent to the pertinent SCs. The situation is aggravated if several mobile phones or terminals to which attempts have been made to send short messages during their absence from the network substantially simultaneously resume contact with the network. In such a situation, with mobile phones accessing the cellular radio network, several SCs attempt to send short messages to the B subscriber, and only some of the transmissions are successful. Thus, acknowledgements indicating failure of transmission and resending of short messages give rise to considerable signalling traffic in the cellular radio network, thus hindering the mobile telephony and jeopardizing the operation of the cellular radio network.

SUMMARY OF THE INVENTION

It is an object of the present invention to eliminate the problems presented by substantially simultaneous arrival in a MSC of short messages for a given subscriber, to speed up the successful relay of short messages, to diminish superfluous signalling and short message traffic in the cellular radio network, and to eliminate the risk of overloading the SC.

This novel method for starting a short message transmission in a cellular radio network is characterized in that the subscriber register sends the short message start messages for a given subscriber to different SCs after delays of variable duration.

The cellular radio system disclosed in this document, comprising a mobile subscriber, at least one short message service centre for relaying short messages through a cellular radio network to the mobile subscriber, and a subscriber register of the subscriber for storing short messages when the mobile subscriber cannot be reached, the subscriber register storing information on the fact that the at least one short message service centre holds short messages for transmission to a subscriber that is not reachable and comprising means for sending a short message transmission start message to the at least one short message service centre when the mobile subscriber can again be reached or when the subscriber data of the subscriber are location updated, is characterized in that the transmission means of the subscriber register comprise means for sending start messages for short message transmission for a given subscriber to different short message service centres after delays of variable duration.

The subscriber register for a cellular radio system disclosed in the present application, comprising means for sending a short message transmission start message to at least one short message service centre, is characterized in that the subscriber register comprises a memory for storing short message transmission start messages, control means for receiving, storing in said memory, reading from said memory, and transmitting short message transmission start messages, transmitter means responsive to the control means for sending start messages for short message transmission for a given subscriber to different short message service centres after delays of variable duration, and delaying means responsive to the transmitter means for generating a variable delay for delaying sending of short message transmission start messages for a desired period of time.

The invention is based on the idea of delaying the sending of subscriber-specific start messages—i.e. Alert messages in the GSM system—for short message transmission that are sent by the subscriber register of the subscriber—in the GSM by the HLR—to the SCs.

The advantage of this method for starting a short message transmission in a cellular radio system, cellular radio system and subscriber register for a cellular radio system resides in that the problems presented by substantially simultaneous arrival of short messages in a MSC are avoided. In other words, the collision of short messages in the MSC of the location area of the B subscriber and the resultant acknowledgements indicating failed transmission, and superfluous signalling and short message traffic are eliminated. Thus, using the method and MSC according to the invention facilitates the successful relay of short messages and diminishes the risk of system failure caused by overload on the cellular radio system and the SC.

BRIEF DESCRIPTION OF THE DRAWINGS

The invention will be more closely explained in the following, with reference to the accompanying drawings, in which, FIG. 2 shows the subscriber data hierarchy in the subscriber's HLR, i.e. subscriber register, FIG. 3 shows a block diagram of the cellular radio system of the invention and its subscriber register:

DETAILED DESCRIPTION OF A PREFERRED EMBODIMENT OF THE INVENTION

In the following, the method of the invention will be described in connection with the digital mobile telephone system GSM, which in fact is the primary application of the invention. The method of the invention can, however, also be applied in other similar mobile systems or modifications of the GSM. The basic configuration and basic facilities of the GSM mobile system are well-known to those skilled in the art and are relatively precisely defined in the GSM system specifications, particularly in "GSM Recommendations 01.02; 11.30; 11.31; 11.32; 03.40."

Figure 1:
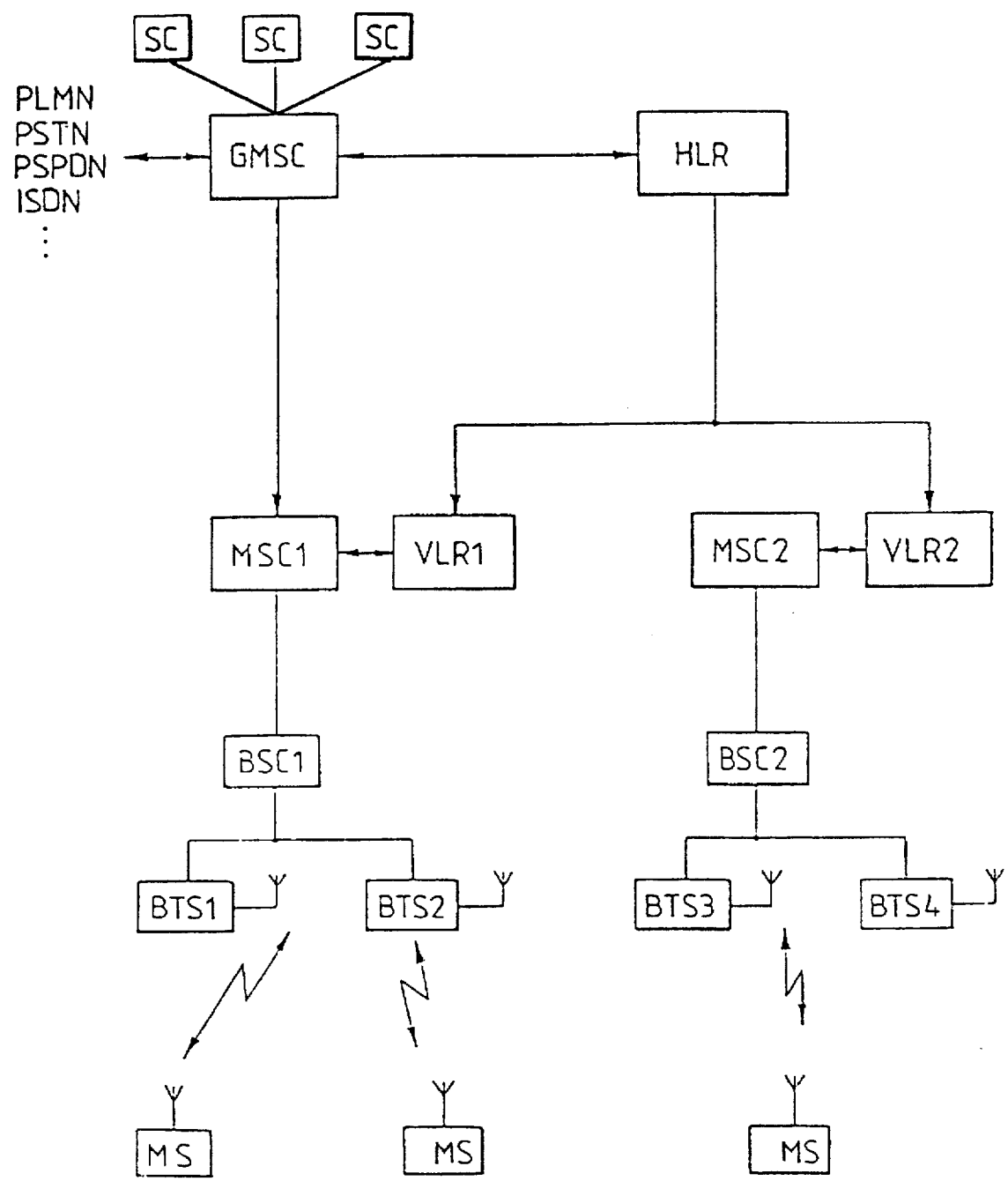
FIG. 1 illustrates schematically a cellular radio system in which the method and MSC of the invention can be used.

The GSM network, illustrated in FIG. 1, generally comprises one home location register HLR, which is a database in which mobile phone data, such as location data, are stored permanently. The HLR performs substantially the same functions as the subscriber register of the invention. The system further comprises several visitor location registers VLR, one or several of such being provided for one MSC service area. The VLR is a database in which mobile phone data are stored while the mobile phone visits the area of the VLR, i.e., the location area of the mobile phone. The VLR has information on the location of the mobile phone MS with an accuracy of one location area. The HLR in turn has information on the VLR that the mobile phone MS visits, and provides routing information to the telephone network for calls terminating in the mobile phone MS, that is, provides the VLR address of the location register of the B subscriber. The HLR, in turn, receives the required routing information from the VLR. The HLR and VLR have solely a signalling connection with the other components of the mobile network. In the system of FIG. 1, each MSC service area has its own visitor location register VLR integrated with the mobile or radio switching centre MSC of that particular service area. The arrangement shown in the figure illustrates two service areas, one with a mobile services switching centre MSC1 and a visitor location register VLR1 and the other with a mobile services switching centre MSC2 and a visitor location register VLR2. There are one or more location areas under each of the two service areas, and, within each location area, a Base Station Controller (BSC) controlling several fixed radio stations or Base Transceiver Stations (BTS) is provided for traffic control. Each radio cell referred to above comprises one base transceiver station BTS, and one base station controller BSC provides services to several cells. The mobile phone MS located in the cell establishes a duplex radio connection with the base transceiver station BTS of the cell. A signalling connection and voice channels are provided between the base station controller BSC and the mobile services switching centre MSC. Correspondingly, within the second service area, the MSC2 has control over a location area comprising a base station controller BSC2 and base transceiver stations BTS3 and BTS4.

The GSM network usually communicates with other networks, such as the public switched telephone network PSTN, another mobile network PLMN, a packet switched data network PSPDN, an ISDN network or a short message service centre SC, through a specific mobile services switching centre called a gateway MSC (GMSC). One or several (all) of the MSCs of the network may serve as a gateway MSC. It is possible to establish a voice channel connection from the GMSC to any other MSC of the network. The GMSC further has a signalling connection with the HLR. The HLR, in turn, has a signalling connection with the VLR. Alternatively, the switching centre of another data transmission system, such as an ISDN centre, may serve as the gateway MSC. FIG. 1 further shows several short message service centres SC sending a short message through the cellular radio network to the mobile phone MS of the B subscriber, and storing, while the subscriber is not reachable, short messages to be later delivered to the subscriber.

FIG. 2 shows the subscriber data hierarchy in the subscriber's HLR, i.e. subscriber register. The subscriber data are stored according to the International Mobile Subscriber Number IMSI of the subscriber in the HLR of the subscriber as subscriber-specific data files, in which the supplementary services to which the subscriber is entitled are stored in addition to the subscriber basic service. The subscriber basic service includes normal telephony service, transmission and reception services for short messages, and various data transmission services. The supplementary subscriber services include call transfer and call barring services and call waiting service, for instance. One subscriber MSISDN number can correspond to a given subscriber basic service, i.e. to the "telephone directory number" of a specific telecommunications service for a given subscriber. The GSM system affords the possibility of sending short messages to a given subscriber according to any telephone directory number of the subscriber, that is, on the basis of the subscriber's corresponding basic service, i.e. the MSISDN number. Each subscriber MSISDN number and each corresponding basic service has a Message Waiting Data (MWD) list of its own, storing the addresses Sc1, Sc2 of the short message service centres from which attempts have been made to transmit short messages to the subscriber basic service identified with the MSISDN (telephone directory number) but which have failed in transmission for some reason, for example because the subscriber has been out of reach while his or her terminal has been located outside the coverage area of the base transceiver station of the radio network, i.e. in a shadow region, or because the subscriber terminal has been switched off.

FIG. 3 shows a subscriber MS having connection with the cellular radio system through a base transceiver station BTS1, BTS2 and through a base station controller BSC and the mobile services switching centre VMSC/VLR of the location area of the subscriber. Short messages are in store in one or several short message service centres SC for delivery to the subscriber MS. The short message service centres access the cellular radio network through a gateway MSC (GMSC/TWMSC). The visitor location register VLR of the location area of the subscriber has information (Message Waiting Flag) on the fact that short messages are stored in the short message service centre SC for delivery to the subscriber. The subscriber register 10, the GSM equivalent of which is the home location register HLR, comprises a HLR functions block 3. When the subscriber has become accessible in the cellular radio network, the subscriber register 10 receives information on this from the visitor location register VLR, since the visitor location register stores information, i.e. holds a Message Waiting Flag, as an indication of the fact that the short message service centre SC stores short messages in wait to be sent to the subscriber MS. In that situation, the HLR functions block 3 of the subscriber register HLR requests the means 1 for sending short message transmission start messages, i.e. the start message transmission functions included in the subscriber register 10, to send start messages for the short messages, i.e. Alert messages in the GSM system, for a given subscriber to the short message service centres SC holding short messages for delivery to the subscriber MS. The start message transmission means 1 sends the start messages for short messages in such a manner that one short message transmission start message is sent to the first short message service centre SC1 in succession on the HLR Message Waiting Data List of the subscriber register 10, corresponding to the subscriber's IMSI-related telephone directory number, i.e. MSISDN number, whereafter the start message transmission means 1 waits a predetermined period of time prior to sending the second start message for short messages in succession to the next short message service centre SC2. For example in the GSM system, the sending of Alert messages is performed in such a way that the start message transmission means 1 requests the communications protocol of the Mobile Applications Part MAP 2 to send a short message transmission Alert message to the short message service centre SC, whereupon the MAP attends to sending the Alert message.

Figure 4:
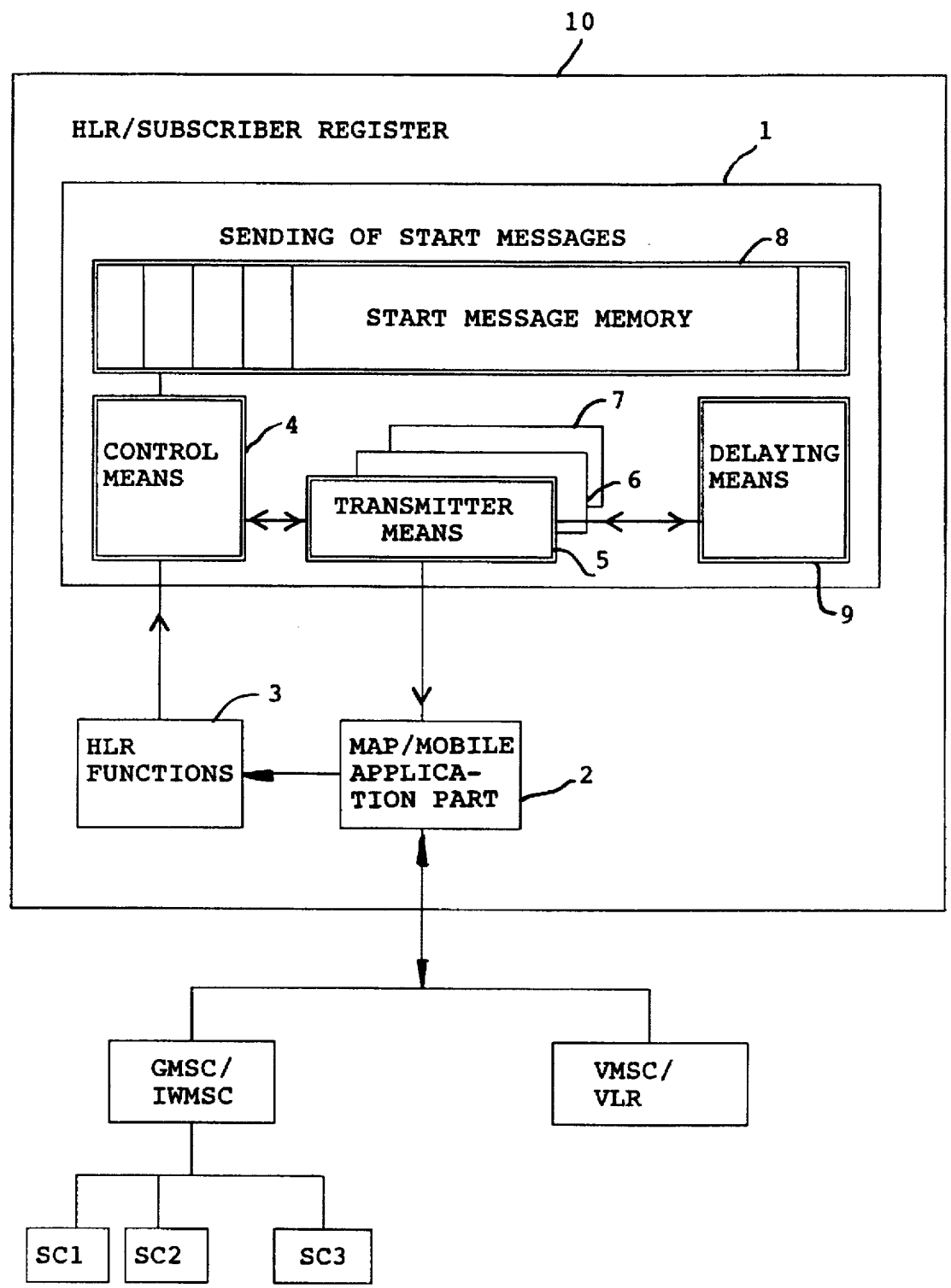
FIG. 4 shows a block diagram of a subscriber register, i.e. HLR, comprising means for sending short message transmission start messages.

FIG. 4 shows a block diagram of a subscriber register, i.e. home location register HLR, 10. When the HLR functions block 3 of the subscriber register 10 receives information via the Mobile Applications Part MAP 2 from the visitor location register VMSC/VLR on the fact that the subscriber MS has become accessible, the HLR functions block 3 sends the IMSI-related MSISDN numbers of the telecommunications services of a given subscriber MS, obtained from the Message Waiting List of the subscriber database 11 of the subscriber register 10, and the telephone numbers of the short message service centres SC1, SC2, SC3 pertaining to the MSISDN numbers to the control means 4 forming part of the start message transmission means 1. The control means 4 is integrated with one or more transmitter means 5, 6, 7 and a memory 8 storing start messages. The control means 4 checks whether one of the transmitter means 5, 6, 7 is unoccupied, and if an unoccupied transmitter means is found, the control means 4 transfer the corresponding data files comprising the IMSI-related MSISDN numbers of a given subscriber and the telephone numbers of the short message service centres SC to the transmitter means 5, 6, 7. If, on the other hand, the control means 4 do not find an unoccupied transmitter means 5, 6, 7, the control means 4 stores said information in the start message memory 8. When one of the transmitter means subsequently becomes available, the control means 4 sends the above information to the available transmitter means 5, 6, 7. The transmitter means 5, 6, 7 then sends a start message for transmission of short messages for a given subscriber to the address SC1 (i.e. telephone number) of the first short message service centre stored in connection with the IMSI-related MSISDN number of the subscriber. If the transmitter means 5, 6, 7 still holds addresses of short message service centres SC2, SC3 to which a short message transmission start message should be sent, the transmitter means 5, 6, 7 requests the delaying means 9 for permission to send start messages, by sending an inquiry to the delaying means 9. Thereafter, the delaying means 9 will wait a predetermined period of time, defined in advance, for instance by means of a software parameter, and thereafter sends a positive acknowledgement to the transmitter means 5, 6, 7. An acknowledgement message, the delaying means 9 gives the transmitter means 5, 6, 7 permission to send a short message transmission start message to the pertinent short message service center SC2, SC3. The transmitter means 5, 6, 7 then sends the information required for sending the start message to the Mobile Applications Part MAP 2 of the HLR, which attends to the actual sending of the short message transmission start message by sending a corresponding message to the desired short message service centre SC1, SC2, SC3. The transmitter means 5, 6, 7 sends start messages to the MAP as long as it holds undelivered start messages under one transmission request received from the control means 4, i.e. messages for one given subscriber MS. Thereafter, the transmitter means 5, 6, 7 informs the control means 4 of its unoccupied status, and the control means 4 possibly assigns the transmitter means 5, 6, 7 a new task. When the short message service centre SC1, SC2, SC3 receives a start message, it sends the message addressed to the subscriber MS through the GMSC to the cellular radio network, for delivery to the desired subscriber MS. It is to be noted in the realization of the apparatus according to the invention, that the start message transmission means 1 is intended to be substantially realized in software.

The drawings and the description pertaining thereto are only intended to illustrate the idea of the invention. The method for starting a short message transmission in a cellular radio network, the cellular radio network and the subscriber register for a cellular radio network according to the invention may vary in their details within the scope of the claims. Even though the invention has been explained in the foregoing mainly in connection with the GSM system, it can also be used in another kind of radio system.

I claim:

1. A method for starting a short message transmission in a cellular radio network, comprising:
   - storing information by a subscriber register on the fact that at least one short message service centre holds short messages for transmission to a subscriber that is not reachable;
   - when the subscriber requests process access to the cellular radio network or when the subscriber data of the subscriber are location updated, sending by the subscriber register of the subscriber a short message transmission start message to said at least one short message service centre; and
   - sending by the subscriber register the short message start messages for a given subscriber to different short message service centres after delays of variable duration.

2. A cellular radio system, comprising:
   a mobile subscriber;
   at least one short message service centre for relaying short messages through a cellular radio network to the mobile subscriber and for storing short messages when the mobile subscriber cannot be reached;
   a subscriber register of the mobile subscriber, storing information on the fact that said at least one short message service centre holds short messages for transmission to a mobile subscriber that is not reachable;
   said subscriber register comprising means for sending a short message transmission start message to said at least one short message service centre when the mobile subscriber can be reached or when the subscriber data of the mobile subscriber are location-updated; the transmission means of said subscriber register comprising means for sending start messages for short message transmission for the mobile subscriber, to different short message service centres, after delays of variable duration.

3. A cellular radio system as claimed in claim 2, wherein said means for sending start messages for short message transmission for the mobile subscriber comprise:
   - a memory for storing short message transmission start messages;
   - a control means for receiving, storing in said memory, reading from said memory, and transmitting short message transmission start messages;
   - transmitter means responsive to said control means for sending start messages for short message transmission for a given subscriber to different short message service centres after delays of variable duration; and
   - a delaying means generating a variable delay, and responsive to the transmitter means, for delaying sending of start messages for short message transmission for the mobile subscriber by said transmitter means for a desired period of time.

4. A subscriber register for a cellular radio system, comprising:
   means for sending a short message transmission start message to at least one short message service centre, said means for sending further comprising:
   - a memory for storing short message transmission start messages;
   - control means for receiving, storing in said memory, reading from said memory, and transmitting short message transmission start messages;
   - transmitter means responsive to said control means for sending start messages for short message transmission for a given cellular radio system mobile subscriber, to different short message service centres, after delays of variable duration; and
   - a delaying means responsive to the transmitter means, generating a variable delay for delaying sending of start messages for short message transmission for said given subscriber by the transmitter means for a desired period of time.

5. A subscriber register as claimed in claim 4, wherein:
   said home location register is a home location register of a GSM system.

* * * * *